United States Patent [19]
Matsui

[11] Patent Number: 4,746,948
[45] Date of Patent: May 24, 1988

[54] FOCUS DETECTION DEVICE

[75] Inventor: Toru Matsui, Sakai, Japan

[73] Assignee: Minolta Camera Kabushiki Kaisha, Osaka, Japan

[21] Appl. No.: 877,782

[22] Filed: Jun. 24, 1986

[30] Foreign Application Priority Data

Jun. 24, 1985 [JP] Japan .................. 60-138457

[51] Int. Cl.[4] .............................................. C03B 3/00
[52] U.S. Cl. .................... 354/408; 354/403; 250/201
[58] Field of Search ............... 354/402, 403, 406, 407, 354/408; 250/201 AF, 201 PF, 204

[56] References Cited

U.S. PATENT DOCUMENTS 4,571,047 2/1986 Hirai ..................... 354/403
4,634,255 1/1987 Suda et al. .............. 354/406

Primary Examiner—W. B. Perkey
Attorney, Agent, or Firm—Burns, Doane Swecker & Mathis

[57] ABSTRACT

A focus detection device for a camera, especially for a single lens reflex camera is disclosed.

The focus detection device provides a light measuring means for measuring the color temperature of light beams being incident thereinto and a correction means for correcting the color temperature of said incident light for focus detection so as to have a predetermined constant color temperature. This correction removes possible errors in focus detection due to the chromatic aberration of an objective lens.

7 Claims, 11 Drawing Sheets

FOCUS DETECTION DEVICE

BACKGROUND OF THE INVENTION

1. Field of the Invention

The present invention relates to a focus detection device for detecting the condition of focusing on a predetermined focal plane.

2. Description of the Prior Art

Generally speaking, one of the important factors required of a focus detection device for a single lens reflex camera is an applicability for a variety of interchangeable objective lens each having an individual F-number and an individual focal length. It is also an important factor that the focus detection can be carried out irrespective of the intensity of an ambient light and/or the brightness of an object.

There is proposed a focus detection system in which an auxiliary illuminating means is installed in an electronic flash device to be mounted on the camera for projecting light beams to an object when the circumference is too dark to carry out the focus control (See U.S. Ser. No. 807,642).

In such an auxiliary illuminating means, a LED (Light Emitting Diode) capable of emitting light of a wavelength of about 700 nm is used as a light source thereof, since such a light being close to the near infrared zone is less stimulative to the eye.

Although the stimulation to the eye is reduced as the wavelength of the light to be emitted becomes longer in such a focus detection system, the chromatic aberration of the objective lens is inevitably increased, and therefore, this lowers the accuracy in the focus detection. Errors in focus detection are caused due to various color temperatures in the case of the so-called passive auto focusing system (passive AF) wherein the focus control is carried out depending only on the ambient light without projecting light onto an object, since the incident light may have a various color temperatures. In the case of the so-called active auto focusing system (active AF) wherein an illuminating light is projected from the camera onto an object and the focus detection is carried out using the light reflected from the object, such bad influences due to the chromatic aberration is not so serious, when compared with the passive AF, since the color temperature of the projection light is constant.

For instance, when an interchangeable lens having a long focal length is used in the passive AF, the focal position obtained in the case when an object is illuminated by a light source having a low color temperature such as a tungsten lamp is differed by several tens $\mu$m, due to the difference in the color temperature, from that obtained in the case when an object is illuminated by a light source having a high color temperature such as day-light.

In order to solve this problem, there has been proposed a focus detection system which comprises a measuring means for measuring the color temperature of a light source, means for giving parameters representing the characteristics of the chromatic aberration of the individual interchangeable lens, whereby errors in the focus detection are corrected according to those calculated due to information such as the color temperature and said parameters given (See JP-A No. 86504/1983, JP-A No. 59413/1983).

According to this system, such a problem as mentioned above is solved. However, it is difficult in an actual sense to correct errors in the focus detection exactly, since it is considerably difficult to obtain parameters representing the exact characteristics of the chromatic aberration of each interchangeable objective lens. The reason why it is difficult is that the characteristics of chromatic aberration are changed due the variety of dispersion characteristics of light about a glass material used for forming each lens element.

SUMMARY OF THE INVENTION

An essential object of the present invention is to provide a focus detection device being capable of removing possible errors in the focus detection due to the chromatic aberration of an individual objective lens without need to have parameters representing the characteristics of the chromatic aberration thereof.

Another object of the present invention is to provide a focus detection device which is able to carry out the focus detection exactly irrespective of the properties of an individual objective lens and the color temperature of an illumination light to an object.

To this end, there is provided a focus detection device, according to the present invention, which comprises a refocusing means, arranged behind said focal plane, for refocusing an image on said focal plane, a light receiving means for receiving the image formed by said refocusing means, a focus detection means for detecting the condition of focusing on said predetermined focal plane of the objective lens according to outputs of said light receiving means, an electrochromic means being arranged in front of said light receiving means in which the color density is varied according to electric power applied thereto, and a control means for controlling the electric power to be applied to said electrochromic means according to a color temperature of light incident into said objective lens.

According to the present invention, light beams incident into the light receiving means are so adjusted as to have substantially the same spectrum according to the color temperature of the light beams incident into the objective lens. Therefore, errors in the focus detection due to the chromatic aberration of an individual interchangeable objective lens can be removed.

BRIEF DESCRIPTION OF THE DRAWINGS

These and other objects and features of the present invention will become apparent from the following description taken in conjunction with a preferred embodiment thereof with reference to the accompanying drawings in which.

DESCRIPTION OF THE PREFERRED EMBODIMENT

Before entering into the description of the preferred embodiment, let us consider the mechanism of errors invited in the focus detection due to the chromatic aberrations of an illuminating light an an object.

Figure 7:
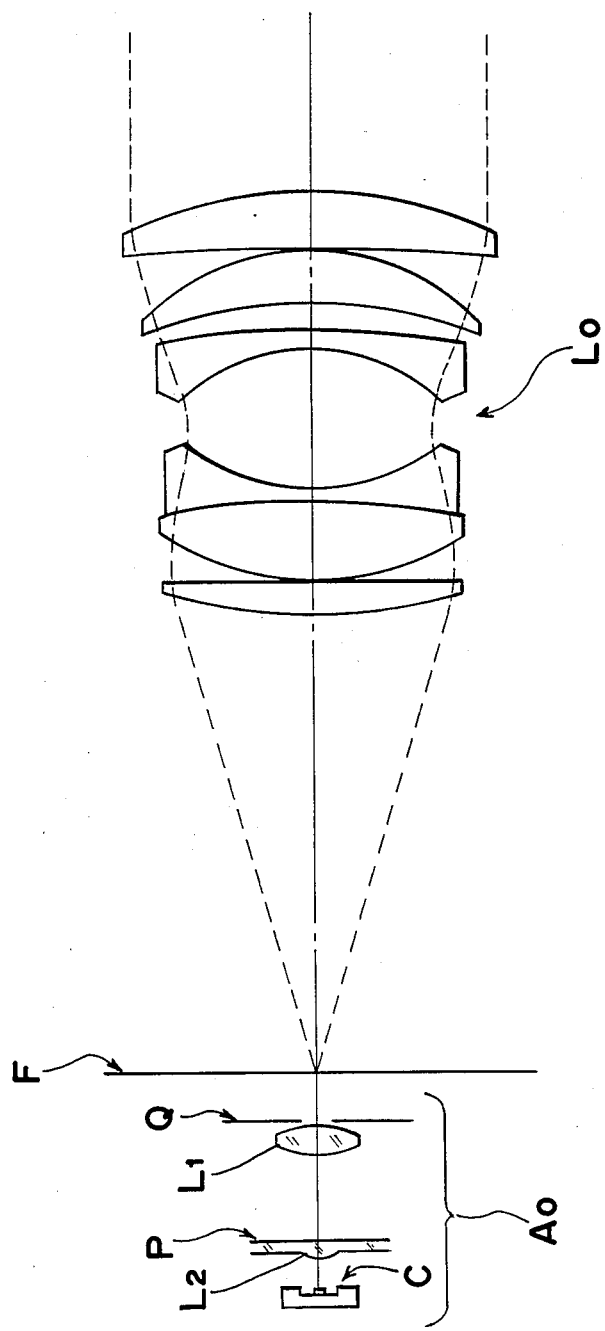
FIGS. 7 and 8 are explanative views each showing optical system for focus detection; respectively.

FIG. 7 shows an optical system for focus detection.

As shown in FIG. 7, an optical focus detection device Ao is arranged behind the focal plane F of an objective lens Lo. Said focus detection device Ao includes two mask plates Q and P being arranged before lens means $L_1$ and $L_2$ respectively and a light receiving device C being comprised of an array of cells of charge-coupled devices (hereinafter referred to as CCD).

Figure 8:
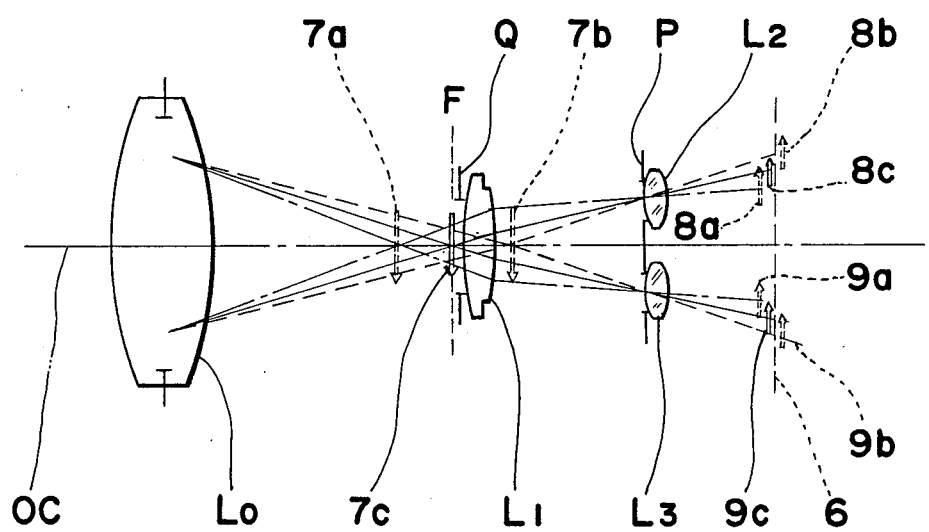

FIG. 8 shows a schematic side elevational view of the focus detection system shown in FIG. 7.

As is well known to those skilled in the art, the focusing condition of the objective lens Lo can be detected by detecting correlation between two images which are formed by two light bundles having been passed through a first and a second portions of the objective lens being so provided oppositely as to interpose the optical axis of the objective lens therebetween.

In order for that, as shown in FIG. 8, a condenser lens $L_1$ is arranged together with the mask plate Q near a a position being equivalent to the focal plane F of the objective lens Lo and two focusing lenses $L_2$ and $L_3$ are respectively arranged adjacent to two iris apertures of the mask plate P being arranged behind the condenser lens $L_1$. On the focal plane 6 common to two focusing lenses $L_2$ and $L_3$, there are arranged right and a left line sensors being comprises of CCD cells respectively.

When the image of an object is focused forward of the focal plane F, as indicated by 7a in FIG. 8, two images 8a and 9a are so focused on said line sensors as to approach to each other thereon interposing the optical axis. Contrary to the above, when the image of an object is focused behind the focal plane F, as indicated by 7b in FIG. 8, two images 8b and 9b are so refocused on said line sensors so as to be remote from each other with respect to the optical axis.

If the image of an object is focused exactly on the focal plane F, as indicated by 7c, the distance between two points of the two refocused images 8c and 9c corresponding to each other becomes a predetermined distance proper to the optical construction of the focus detection system employed. Accordingly, it becomes possible to detect the focusing condition of the objective lens Lo by calculating the correlation between two light distribution patterns on the line sensors according to electric output signals therefrom.

Figure 9:
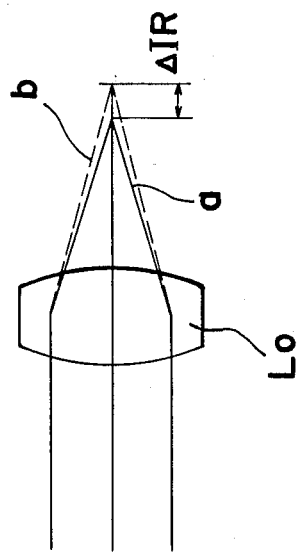
FIG. 9 is an explanative view for showing errors caused by the chromatic aberration of an objective lens.

Next, let us consider the mechanism of errors in the focus detection which might be caused by the chromatic aberration of an objective lens in the case, as shown in FIG. 9, of two light rays a and b having a wavelength different from each other having been passed through the objective lens Lo.

Figure 10:
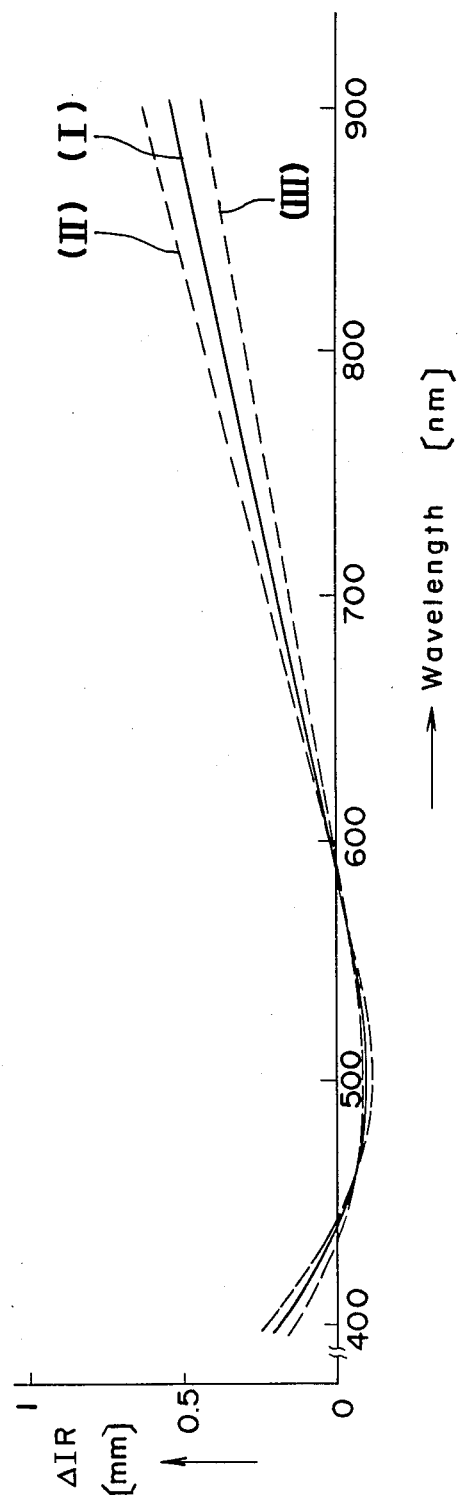
FIG. 10 is a graph showing the relation between the chromatic aberration of an objective lens and the wavelength of light.

FIG. 10 is a graph showing the relation between the chromatic aberration of the objective lens and the wavelength of light. In FIG. 10, the horizontal axis represents the wavelength and the vertical axis represents the amount of defocusing ΔIR measured from the standard focal position which is obtained by using the d-ray of 589 nm as a standard light ray.

The curve (I) indicates a standard curve obtained by an objective lens designed according to a standard specification which is intended to obtain the best result by said d-ray of 589 nm. The curves (II) and (III) indicate curves deviated from the standard curve (I) due to the variety in the characteristic of color dispersion of glass material constituting individual lens element of the objective lens. In the case of a zoom lens system constructed by a number of lenses, the deviation from the standard curve (I) is increased. Therefore, it becomes necessary to introduce parameters for correction which are different from each other according to each lens construction of the objective lens, if it is required to correct errors in the focus detection due to the chromatic aberration exactly. In other words, it is necessary to give one or more parameters proper to the individual objective lens, since the characteristic of the color dispersion of the glass itself can be varied, even if the lens construction the same.

Said amount of defocus ΔIR is the amount of the chromatic aberration as defined in FIG. 9. Namely, assuming that the light ray a represents a visible light ray and the light ray b represents an infrared light ray, the amount of chromatic aberration is defined as a distance Δ IR between the focus point by the light ray a and the focus point by the light ray b. As is apparent from FIG. 10, the amount of chromatic aberration ΔIR become larger as the wavelength of the light ray b becomes longer.

In order to minimize possible errors in the focus detection system which might be caused due to the chromatic aberration, it may be considered to block light components having relatively long wavelengths being included in the light incident into the optical system for focus detection with use of an infrared light blocking filter.

However, if such an infrared light blocking filter is introduced in the focus detection system, there is invited another problem as follows.

In the single lens reflex camera in which both the passive and active AF modes are available, an a LED that emits light having a wavelength of 700 nm, close to the near infrared light is used as a light projection means in order to reduce the stimulation to the eye as mentioned above. Accordingly, the infrared light blocking filter should be so chosen as make the light having a wavelength near to the wavelength of 700 nm pass. But the wavelength of about 700 nm is considerably longer when compared with that of day-light. As a result of that, the best focus position is shifted when the light having a wavelength of about 700 nm is incident into the optical system for focus detection, if said optical system is adjusted to give the best result when light having a wavelength of 589 nm is incident.

Figure 11:
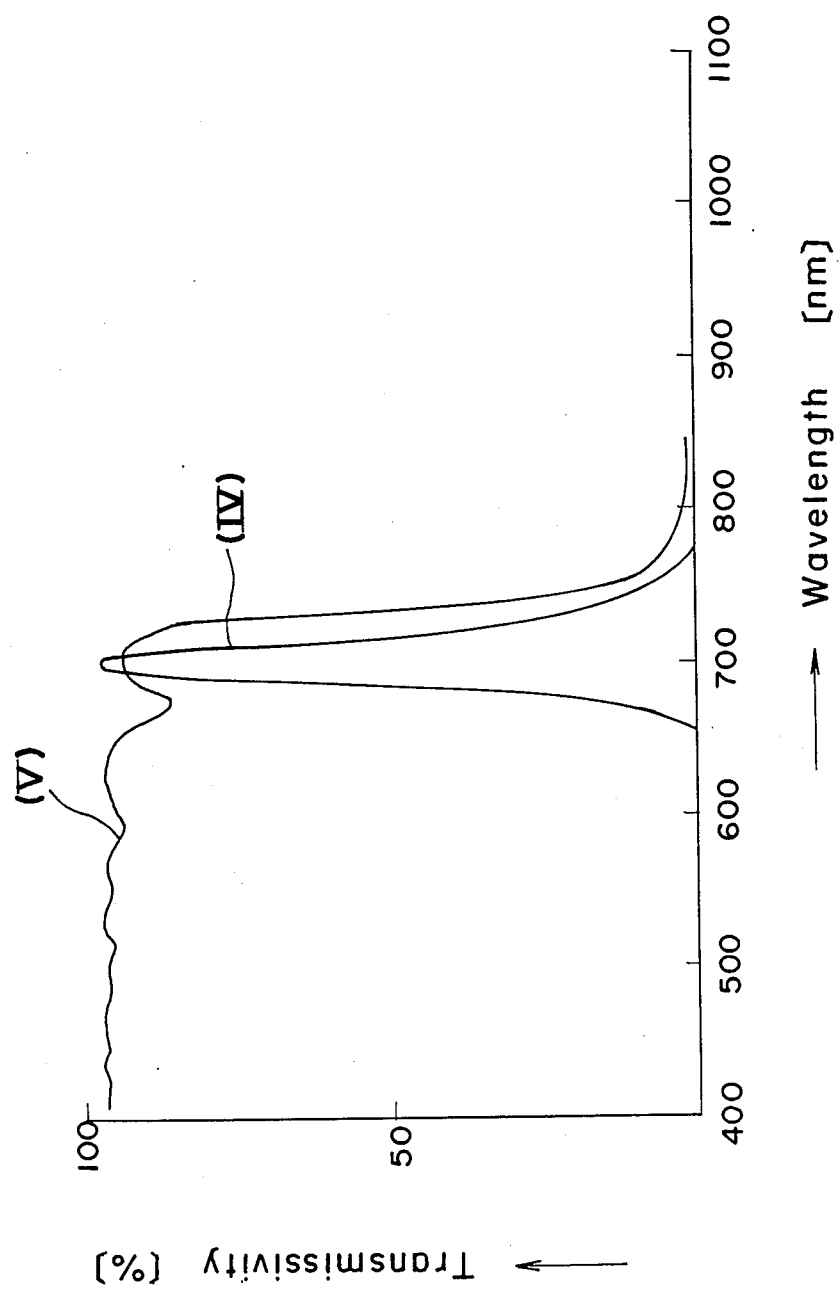
FIG. 11 is a graph showing the spectrum of the light emitted by an LED and the spectral transmissivity of an infrared light filter.
Figure 12:
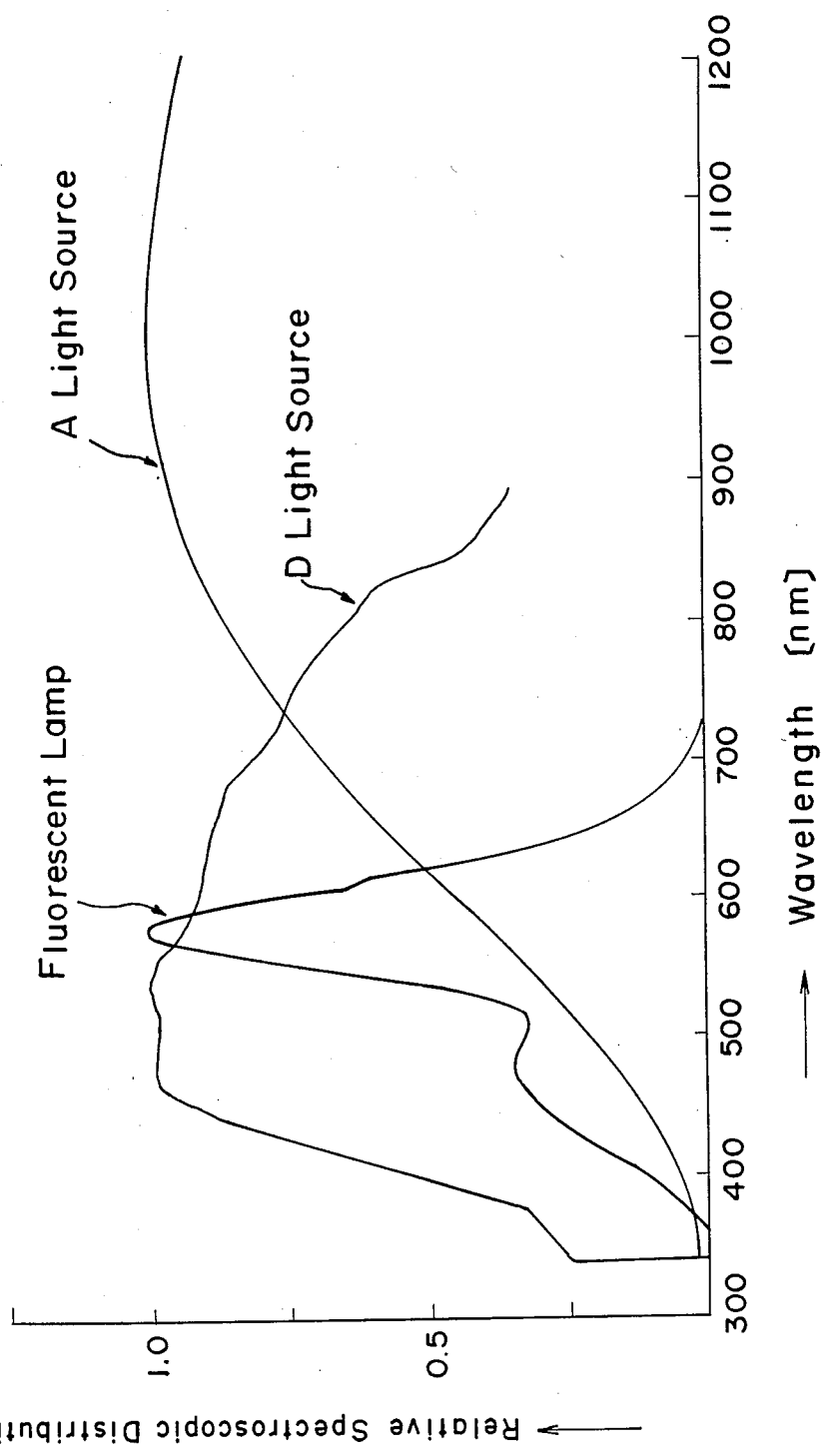
FIG. 12 is a graph showing each spectrum of a variety of light sources for illuminating an object.
Figure 13:
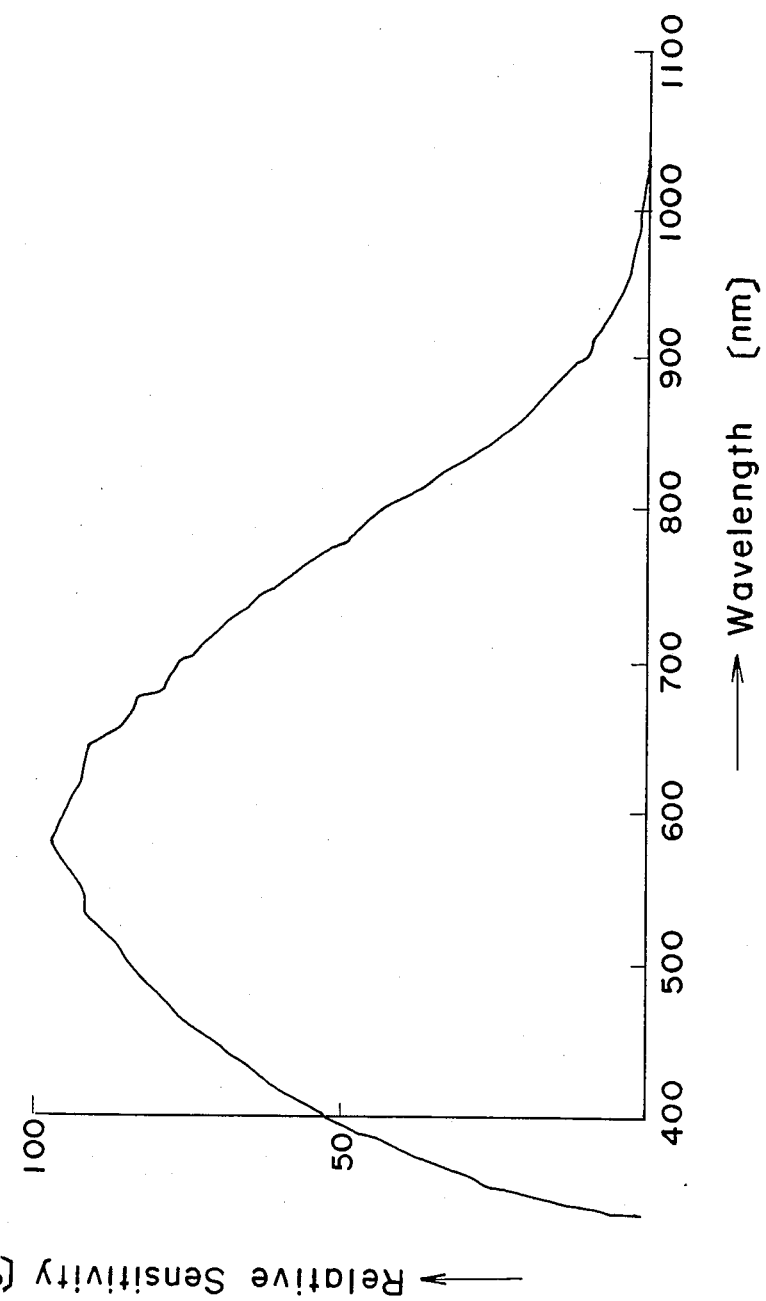
FIG. 13 is a graph showing the characteristic of the spectral sensitivity of a light receiving device for focus detection.

FIG. 11 shows the spectral characteristic (IV) of a LED having a peak at the wavelength of 700 nm and the spectral transmissivity (V) of the infrared light blocking filter. This infrared light blocking filter is, of course, arranged in the light path of the optical system for focus detection. FIG. 12 shows the relative spectrums of various light sources. The horizontal axis represents the wavelength and the vertical axis represents the relative spectral intensity. FIG. 13 shows a characteristic of spectral sensitivity of the light receiving device for focus detection. The horizontal axis represents the wavelength and the vertical axis represents the relative sensitivity.

If the focus detection is carried out with the infrared light blocking filter as shown in FIG. 11 and the light receiving device as shown in FIG. 13, the amount of chromatic aberration becomes large, on the order of 0.2 mm to 0.4 mm, as is apparent from FIGS. 10 and 12, when an object is illuminated by the light including plenty of light components of 700 to 800 nm such as the light source indicated by A in FIG. 12. This invites large errors in the focus detection.

Contrary to the above, when an object is illuminated by the light source including less infrared light components such as the D light source of FIG. 12, the amount of chromatic aberration $\Delta IR$ becomes smaller, and therefore, errors in the focus detection become small.

As is understood from the above mentioned, it is best to minimize the infrared light components of the light incident into the light receiving device C of the focus detection system in the passive AF in order to decrease possible errors due to the chromatic aberrations. This can be achieved by introducing an electrochromic device into the focus detection system in which the transmissivity thereof can be controlled electrically. The electrochromic device is controlled in the passive AF according to the color temperature of the incident light.

Further, said electrochromic device is so controlled in the active AF as to make the light including light components of about 700 nm pass therethrough and the best focus position is adjusted with use of the light of about 700 nm emitted from the LED.

Figure 1:
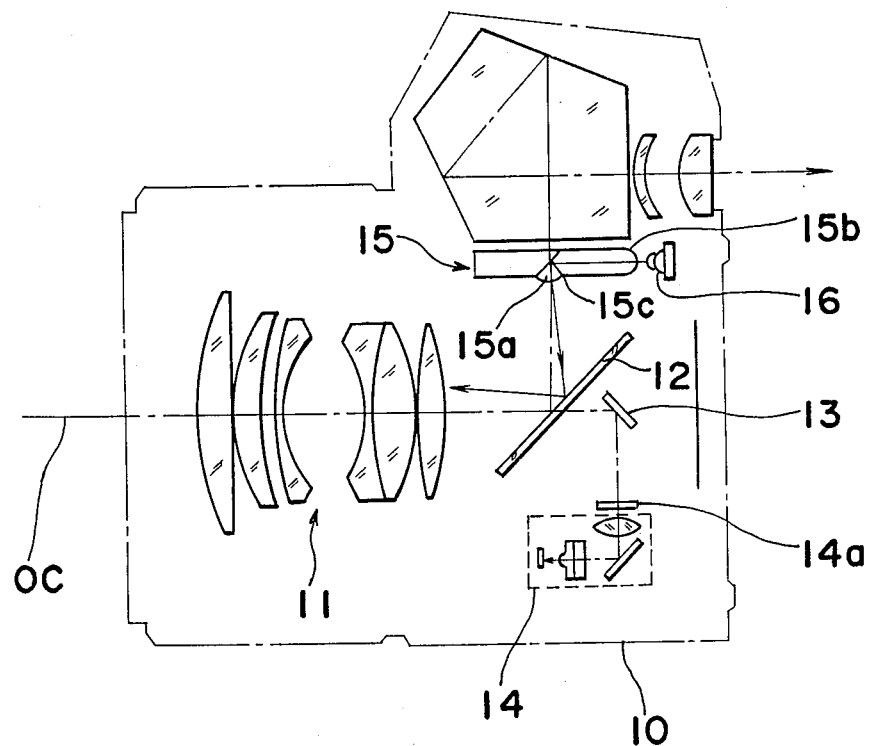
FIG. 1 is a schematical sectional view of a single lens reflex camera with a focus detection device according to the present invention.

FIG. 1 shows the preferred embodiment of a single lens reflex camera including a focus detection device being capable of removing possible errors caused by the chromatic aberration of the objective lens.

In FIG. 1, the reference numeral 10 indicates the camera body, the reference numeral 11 indicates an interchangeable objective lens and the reference numeral 12 indicates a reflex mirror which reflects light rays having been passed through the objective lens 11 toward the finder system housed in the camera body 10 and through the portion of which a part of the reflected light rays is introduced into the optical assembly 14 for focus detection. A small mirror 13 is provided behind the reflex mirror 12 for introducing the light rays having been passed through said portion of the reflex mirror 12.

An optical member 15 is provided under a pentagonal roof prism parallel to the bottom plane of said prism. The optical member 15 constitutes a convex lens with a convex portion 15a projected downward, a convex portion 15b projected so as to oppose LED 16, arranged beneath the pentagonal roof prism and a half mirror 15c provided at a portion where both center lines of the two convex portions 15a and 15b cross with each other. Said half mirror 15c can be such an optical filter as to reflect light rays emitted from LED 16 and to pass the visible light. The angle of the half mirror 15c is so set as to reflect the light emitted from LED 16 in such a manner that the light rays after having been reflected by the reflex mirror 12 may be inclined at a small angle against the optical axis OC and, therefore, the light rays from LED 16 are projected to the exterior passing through the portion of the objective lens other than the optical axis OC.

Figure 2:
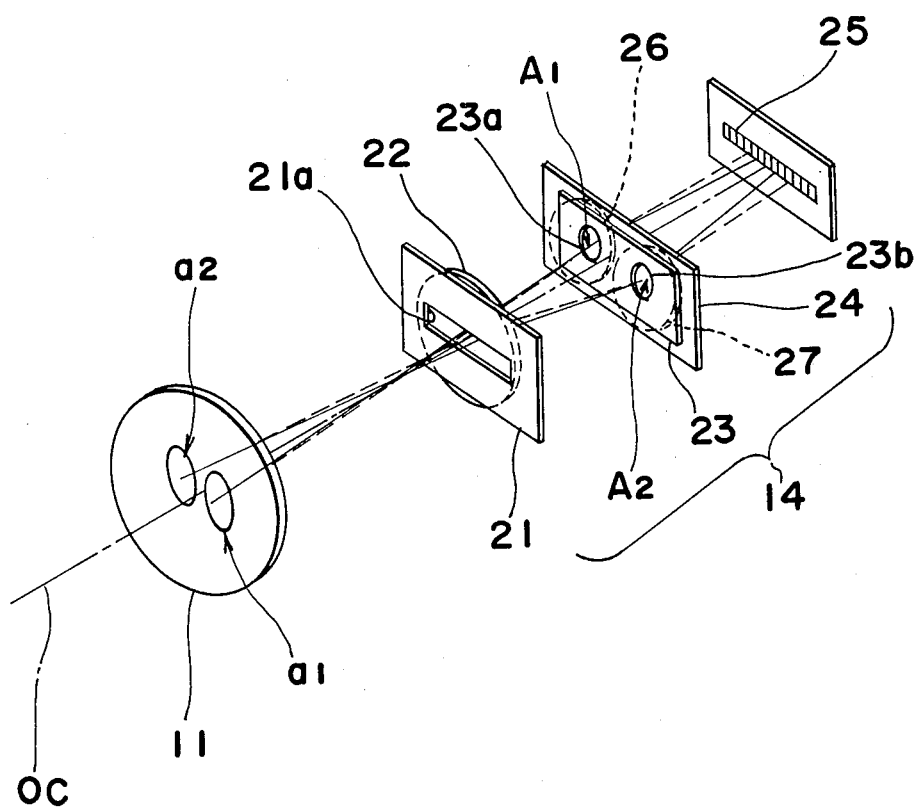
FIG. 2 is a perspective view showing an optical system of the focus detection device shown in FIG. 1.

FIG. 2 shows an example of the composition of the optical system for focus detection according to the present invention.

In FIG. 2, a mask 21 having one slit-like aperture 21a is arranged on a plane being near and parallel to the focal plane of the objective lens 11. On the rear surface of the mask 21, there is arranged a condenser lens 22. Rearward of the mask 21, there is arranged an iris plate 23 having two iris aperture 23a and 23b disposed to have a predetermined distance therebetween in the lengthwise direction of the iris plate 23. Each iris aperture 23a and 23b are formed of an oval shape, respectively.

On the rear surface of the iris plate 23, an electrochromic device 24 is attached. $A_1$ and $A_2$ indicate areas through which light beams are passed. Further, two secondary focusing lenses 26 and 27 are so arranged adjacent the rear side of the electrochromic device 24 as to correspond to iris apertures 23a and 23b respectively.

These two secondary focusing lenses 26 and 27 are provided for focusing two light bundles onto a light receiving device 25 comprised of a one dimensional array of CCD cells. The two light bundles have been passed through first and second areas $a_1$ and $a_2$ of the objective lens respectively, and through two iris apertures 23a and 23b of the iris plate 23.

Figure 3:
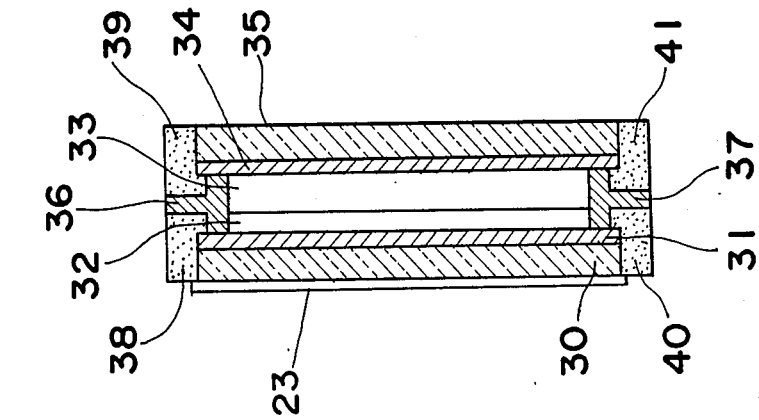
FIG. 3 is a cross-sectional view showing an internal structure of an electrochromic device according to the present invention.

FIG. 3 shows a cross sectional view of the electrochromic device 24.

As shown in FIG. 3, the electrochromic device 24 comprises a transparent glass plate 30, on the outer surface of which the iris plate 23 is adhered to. On the inner surface of the glass plate 30, there is formed a transparent electrode 31 made of a transparent electroconductive material.

Between the glass plate 30 and a transparent glass plate 35 on the inner surface of which a transparent electrode 34 is formed by coating, there are interposed an electrocromic layer 32 made of tungsten oxide or iridium hydroxide and an electrolytic layer 33. The peripheries of these two layers 32 and 33 are sealed by common seal members 36 and 37.

As is well known to those skilled in the art, if the electrochromic layer 32 is made of tungsten oxide, it is colored when a proper negative voltage is applied to the electrode contacting thereto. If it is made of iridium hydroxide, it is colored when a proper positive voltage is applied to the electrode contacting thereto.

Further, along the upper and lower edges of the glass plates, there are provided a first and a second electrodes 38, 39, 40 and 41 contacting electrically to said first and second transparent electrodes 31 and 34 respectively.

As is well known to those skilled in the art, the color density of the electrochromic device 24 can be varied by controlling electric power applied thereto. Once the electrochromic layer 32 is colored, the spectrum of the light having been passed through iris aperture 23a and 23b and said electrochromic layer 32 is changed from that of the original light incident into the objective lens. When the power supply is stopped to the electrochromic device, the color density thereof is kept at the density obtained at the time of turn off of the electric power source. In order to remove the color, a voltage of reversed polarity is applied thereto.

Figure 4:
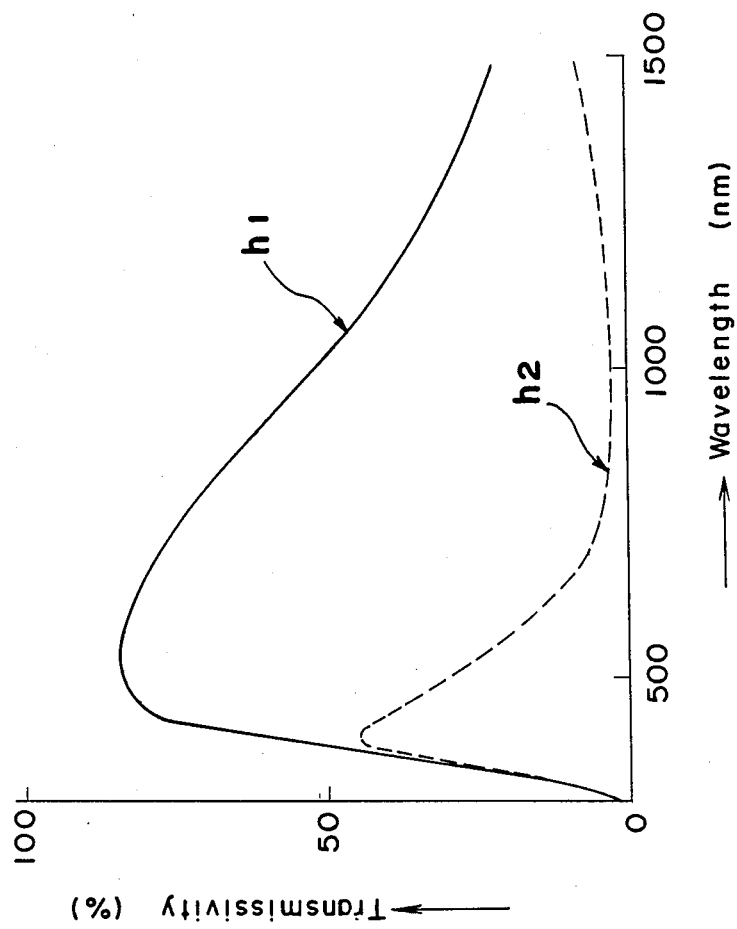
FIG. 4 is a graph showing the spectral transmissivity of the electrochromic device.

FIG. 4 shows the spectral characteristic of the transmissivity of the electrochromic layer. The curve $h_1$ shows the spectral characteristics of the transmissivity obtained at the time that the color thereof is well erased and the curve $h_2$ shows that obtained at the time that it is well colored.

As is apparent from the comparison of these characteristics ($h_1$, $h_2$), the transition from the state ($h_1$) to the colored state ($h_2$) is caused due to the fact that the absorption of near infrared light is so increased as to invite the absorption of the red zone of visible light. Therefore, the color density can be adjusted arbitrarily between said two characteristics $h_1$ and $h_2$ by stopping the power supply at a suitable time.

The present invention utilizes such a property of the electrochromic device as mentioned above. Namely, if the incident light for focus detection has plenty of light components included in the infrared zone, the color density of the electrochromic device is increased, i.e. the transmissivity against the infrared zone is decreased, in order to block those light components. In other words, the color temperature of the incident light is so corrected as to have a substantially constant value with respect to the focus detection system.

Figure 5:
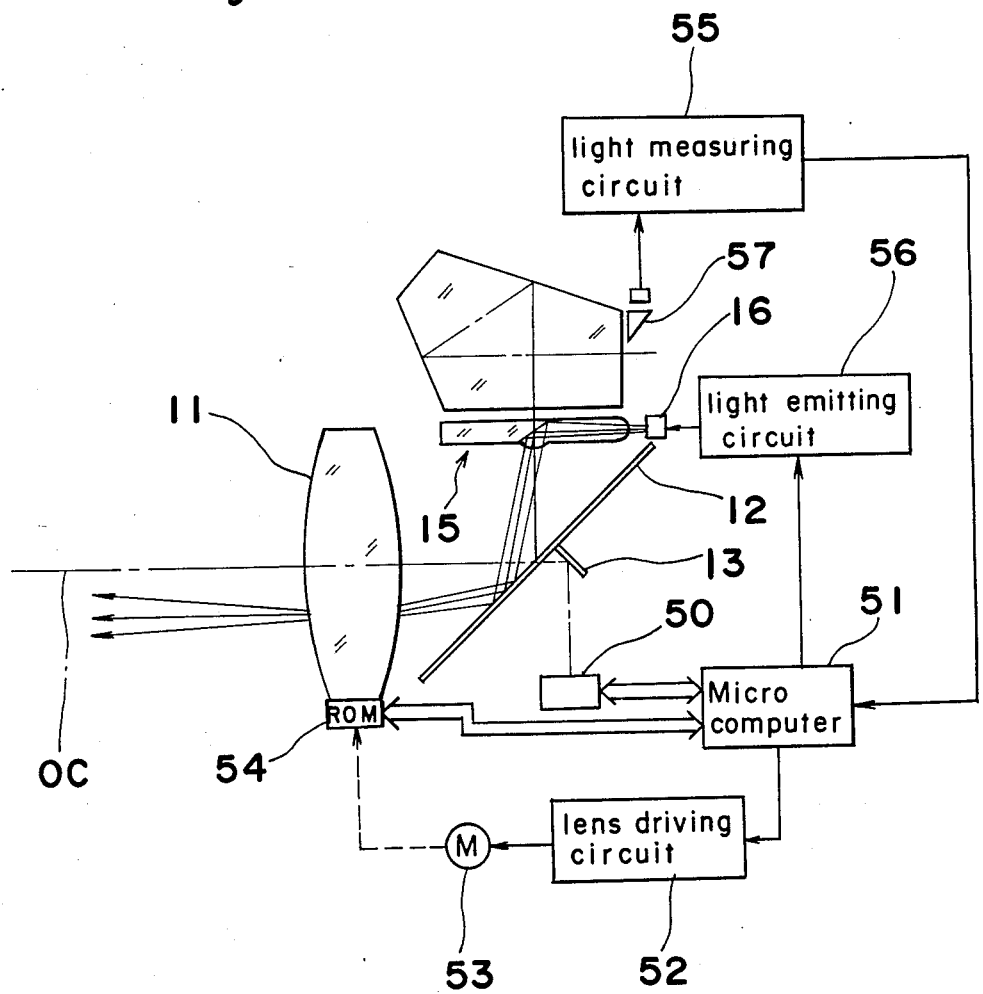
FIG. 5 is a block diagram showing a circuit for focus detection according to the present invention.

FIG. 5 shows a block diagram of a circuit for focus detection. A focus detection circuit 50 sends signals to a microcomputer 51 installed in the camera. The microcomputer 51 calculates the focusing condition according to output signals from the focus detection circuit 50 and, according to the result obtained, sends control signals to a lens driving circuit 52 for driving a lens motor 53. The lens motor 53 shifts the objective lens 11 via the shifting mechanism (not shown in FIG. 5). As schematically shown in FIG. 5, the objective lens provides a ROM (Read Only Memory) means 54 therein in which a variety of informating about of the individual objective lens such as F-number, type of lens composition (refractive type, reflective type), focal length, amount of spherical aberration and so on, are memorized therein. The camera also has a light measuring circuit 55 for measuring the brightness of an object and the color temperature of the incident light according to outputs of a sensor 57. The light measuring circuit 55 outputs a command signal to a light emitting circuit 56 for energizing a LED when the object is too dark to detect the focusing condition by the passive AF. When said command signal is input into the microcomputer 51, the latter 51 controls the electrochromic device 24 to switch iris areas referring to information stored in the ROM 54.

Although the spectrum of the light incident into the sensor 57 and that of the light incident into the light receiving device are desirably the same as each other, if they are different from each other, the color temperature detected by the sensor 57 should be corrected according to the difference therebetween.

When the active AF mode is chosen, the microcomputer 51 sends a signal to the focus detection circuit 50 in order to erase the color of the electrochromic device 24. Therefore, the light having been projected by LED 16 and reflected from an object is incident into the light receiving device 25 and the focus detection for the objective lens 11 is carried out according to information detected thereby.

Contrary to the above, the mode is switched from the active AF mode to the passive AF mode when the brightness of an object is higher than a predetermined value. In this passive AF mode, the microcomputer 51 controls the color density of the electrochromic device 24 according to information about the color temperature from the light measuring circuit 55 in order to correct the color temperature of the incident light to be used for focus detection. This removes possible errors in the focus detection due to the chromatic aberration of the objective lens.

Figure 6:
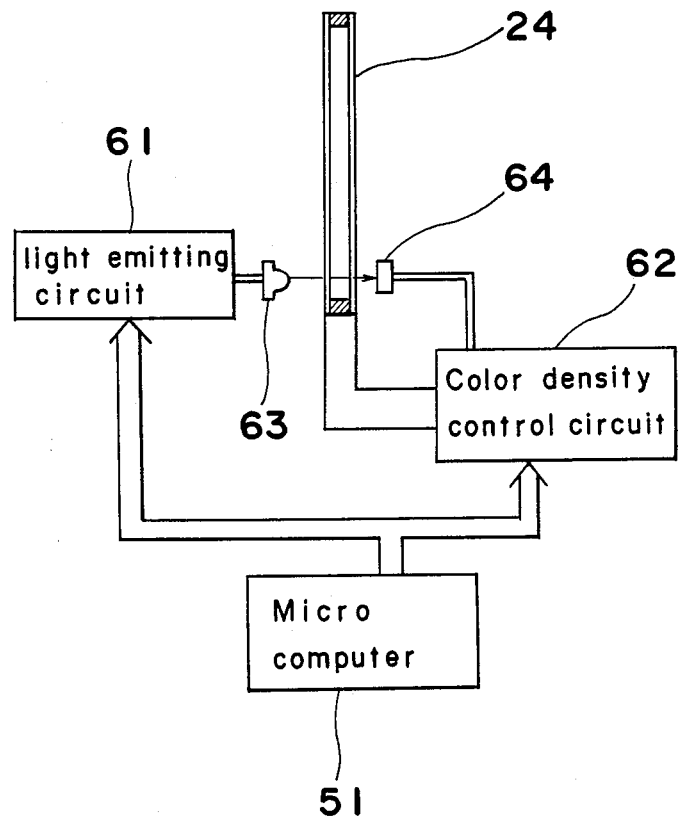
FIG. 6 is a block diagram of a device for controlling the color density of the electrochromic device.

FIG. 6 shows a circuit for controlling the color density of the electrochromic device 24.

In the circuit, there are provided a light emitted circuit 61 for controlling an infrared LED 63 to turn on or off and a color density control circuit 62 for controlling the electric power to be applied to the electrochromic device 24 according to the result obtained by monitoring a light receiving device 64 which is arranged opposed to said infrared LED 63. Said color density control circuit can control the color density, for instance, by changing the supply time of the electric power.

Although it is possible to omit the light emitting circuit 61 and infrared LED 63 by controlling the supply time exactly, it becomes necessary to adjust the supply time according to the ambient temperature since the responsive characteristic of the electrochromic device is varied dependent on the temperature.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A focus detection device for detecting the condition of focusing on a predetermined focal plane of an objective lens comprising:
    (A) a refocusing means for refocusing an image on said focal plane which is arranged behind said focal plane;
    (B) a light receiving means for receiving the image formed by said refocusing means;
    (C) a focus detection means for detecting the condition of focusing on said predetermined focal plane of the objective lens according to outputs of said light receiving means;
    (D) an electrochromic means arranged in front of said light receiving means (B) in which the color density is varied according to electric power applied thereto; and
    (E) a control means for controlling the electric power to be applied to said electrochromic means according to a color temperature of light incident into said objective lens.

2. A focus detection device according to claim 1, in which said electrochromic means (D) is comprised of an electrochromic device.

3. A focus detection device according to claim 1, in which said control means (E) comprises a measuring means ($E_1$) for measuring the color temperature of light beams incident into the objective lens and an electric power control means ($E_2$) for controlling an electric power to be applied to said electrochromic means according to the color temperature measured.

4. A focus detection device according to claim 3, in which there is further provided a light measuring means (F) for measuring the intensity of light beams passing through the objective lens, wherein the spectral characteristic of said light receiving means (B) is substantially the same as that of the measuring means (F) for measuring the color temperature.

5. A focus detection device according to claim 1, in which there is provided a light bundle restricting means (G) for restricting the width of the light bundle incident onto said light receiving means, wherein said electrochromic means (D) is arranged near said light bundle restricting means (G).

6. A focus detection device according to claim 1, in which said control means (E) further comprises a monitor means ($E_3$) for monitoring the color density of the electrochromic means (D) and a control means for controlling an electric power to be applied to the electrocromic means (D) according to outputs of said monitoring means.

7. A focus detection device according to claim 1, in which there is further provided a light projection means for projecting near infrared light rays onto an object.

* * * * *